(12) United States Patent
Pflug et al.

(10) Patent No.: US 8,795,806 B2
(45) Date of Patent: Aug. 5, 2014

(54) HALF CLOSED THERMOPLASTIC HONEYCOMB, THEIR PRODUCTION PROCESS AND EQUIPMENT TO PRODUCE

(75) Inventors: Jochen Pflug, Wiesbaden (DE); Ignace Verpoest, Kessel-Lo (BE)

(73) Assignees: K.U. Leuven Research & Development, Leuven (BE); Jochen Pflug, Wiesbaden (DE)

( * ) Notice: Subject to any disclaimer, the term of this patent is extended or adjusted under 35 U.S.C. 154(b) by 800 days.

(21) Appl. No.: 11/719,748

(22) PCT Filed: Nov. 21, 2005

(86) PCT No.: PCT/BE2005/000168
§ 371 (c)(1),
(2), (4) Date: May 18, 2007

(87) PCT Pub. No.: WO2006/053407
PCT Pub. Date: May 26, 2006

(65) Prior Publication Data
US 2008/0176027 A1 Jul. 24, 2008

(30) Foreign Application Priority Data

Nov. 19, 2004 (EP) .................................. 04447255

(51) Int. Cl.
*B32B 3/00* (2006.01)
*B32B 3/12* (2006.01)

(52) U.S. Cl.
CPC ........................................ *B32B 3/12* (2013.01)
USPC ................. 428/73; 428/72; 428/116; 264/48; 425/237

(58) Field of Classification Search
USPC ........................................................ 428/72, 73
See application file for complete search history.

(56) References Cited

U.S. PATENT DOCUMENTS

| | | |
|---|---|---|
| 3,887,418 A | 6/1975 | Jurisich |
| 3,912,573 A | 10/1975 | Kunz |
| 4,500,380 A | 2/1985 | Bova |
| 4,948,445 A | 8/1990 | Hees |
| 4,992,132 A | 2/1991 | Schmidlin et al. |
| 5,217,556 A | 6/1993 | Fell |
| 5,324,465 A | 6/1994 | Duffy et al. |
| 5,334,276 A | 8/1994 | Meier |

(Continued)

FOREIGN PATENT DOCUMENTS

| | | |
|---|---|---|
| CA | 2347844 | 3/2007 |
| DE | 16 27 772 A1 | 2/1971 |

(Continued)

OTHER PUBLICATIONS

Office Action for Australian Patent Application No. 2005306514, dated Dec. 1, 2009.

(Continued)

*Primary Examiner* — Mark Ruthkosky
*Assistant Examiner* — Daniel J Schleis
(74) *Attorney, Agent, or Firm* — Clark & Elbing LLP

(57) ABSTRACT

A half closed thermoplastic folded honeycomb structure is described which is produced from a continuous web of material by plastic deformation perpendicular to the plane of the material to thereby form half-hexagonal cell walls and small connecting areas. By folding in the direction of conveyance the cell walls meet to thereby form the honeycomb structure.

16 Claims, 6 Drawing Sheets

(56) References Cited

U.S. PATENT DOCUMENTS

| | | | |
|---|---|---|---|
| 5,399,221 A | 3/1995 | Casella | |
| 6,183,836 B1 * | 2/2001 | Pflug | 428/116 |
| 6,726,971 B1 | 4/2004 | Wong | |
| 6,726,974 B1 * | 4/2004 | Pflug et al. | 428/73 |
| 6,800,351 B1 | 10/2004 | Pflug et al. | |
| 6,800,480 B1 | 10/2004 | Bodnar et al. | |
| 7,024,907 B2 | 4/2006 | Beauvois et al. | |
| 7,541,085 B2 | 6/2009 | Burdon | |

FOREIGN PATENT DOCUMENTS

| | | |
|---|---|---|
| DE | 16 04 699 A1 | 3/1971 |
| DE | 19609309 A1 | 9/1997 |
| JP | 56-150534 | 11/1981 |
| JP | 08-164578 | 6/1996 |
| JP | 2000-246818 | 9/2000 |
| JP | 2001-017163 | 1/2001 |
| JP | 2007-040134 | 2/2007 |
| JP | 2008-164578 | 7/2008 |
| WO | WO 91/00803 | 1/1991 |
| WO | WO 95/10412 | 4/1995 |
| WO | WO 97/03816 | 2/1997 |
| WO | WO 00/32382 | 6/2000 |

OTHER PUBLICATIONS

International Preliminary Report on Patentability and Written Opinion of the International Search Authority for PCT/BE2005/000168 dated May 22, 2007 and mailed May 31, 2007.

Office Action issued in connection with Japanese Patent Application No. 2007-541587, mailed Oct. 7, 2008.

English language translation of Office Action issued in connection with Japanese Application No. 2007-541587, mailed Oct. 7, 2008.

English language abstract of Japanese Patent Application No. JP 07-040134, published Feb. 10, 1995.

International Search Report for PCT/BE2005/000168, mailed Mar. 17, 2006.

Office Action for Chinese Patent Application No. 200580039351.2, dated Aug. 20, 2010. English Translation Provided.

Office Action for Chinese Patent Application No. 200580039351.2, dated Dec. 13, 2011.

English Translation of Office Action for Chinese Patent Application No. 200580039351.2, dated Dec. 13, 2011.

Korean Intellectual Property Office, Notice of Preliminary Rejection, from Korean Patent Application No. 10-2007-7011290, dated Jul. 13, 2012 (English translation attached) 4 pp.

* cited by examiner

HALF CLOSED THERMOPLASTIC HONEYCOMB, THEIR PRODUCTION PROCESS AND EQUIPMENT TO PRODUCE

The present invention relates to cellular structures such as folded honeycomb structures, methods of manufacturing the same and equipment for manufacturing the same. In particular, the present invention concerns a thermoplastic folded honeycomb structure, a process and equipment to produce the same.

TECHNICAL BACKGROUND

Folded honeycombs known from WO 97/03816 are produced continuously from a single layer, e.g. a flat body. Hexagonal cells are constructed by folding after the introduction of cuts. The cells are bridged by covering-layer connecting surfaces. Folded honeycombs without cuts can be produced economically from one continuous layer of thermoplastic film by rotational vacuum thermoforming. Such folded honeycombs are described in WO 00/32382 and have connecting surfaces covering every hexagonal cell on both sides.

SUMMARY OF THE INVENTION

An object of the invention is to be able to provide methods and apparatus to produce folded honeycombs without using cuts.

An advantage of the present invention is that it enables vacuum forming and a good attachment to the covering layers. A further advantage is a minimal material usage.

The object is achieved in accordance with the subject matter of the attached claims and further developed by further features of the subclaims.

The present invention provides a folded honeycomb structure, formed from a plurality of cells arranged in rows, comprising: cells have lateral cell walls which adjoin one another in the form of a ring and are bounded toward two opening sides of each cell by covering-layer planes whereby the cells are each bridged partially or completely in one or other of the covering-layer planes; the folded honeycomb being formed from a substantially uncut flat body; the folded honeycomb having a plurality of 3D-structures (1 and 2) formed by plastic deformation and connecting areas (3 and 4) produced by the plastic deformation, the connecting areas (3, 4) being located in one or other of the covering-layer planes in the folded honeycomb.

In a further aspect of the present invention, a flat body, e.g. a web of material, is plastically deformed mainly perpendicularly to the material plane and narrowed, e.g. folded, in the conveying direction, until the cell walls meet and can be connected. Connection areas having a u- or v-shape are formed between the half-hexagonal cell walls to enable a good attachment of the honeycomb cell walls to both covering layers with a minimal amount of additional material.

Accordingly, the present invention provides a process for producing a folded honeycomb from a flat body composed of a plastically deformable material, comprising:
a) plastically deforming the flat body to form first 3D-structures (1 and 2) and second connection areas (3 and 4) therein, the second connection areas being formed between first 3D-structures; and
b) folding the 3D-structures towards each other to form cells having cell walls which adjoin one another in the form of a ring so that a cell wall of one cell adjoins the cell wall of another cell in a honeycomb structure.

Further the present invention provides an equipment for producing a folded honeycomb a flat body composed of a plastically deformable material, comprising:
a) means for plastically deforming the flat body to form first 3D-structures (1 and 2) and second connection areas (3 and 4) therein, the second connection areas being formed between first 3D-structures; and
b) means for folding the 3D-structures towards each other to form cells having cell walls which adjoin one another in the form of a ring so that a cell wall of one cell adjoins the cell wall of another cell in a honeycomb structure.

BRIEF DESCRIPTION OF THE DRAWINGS

The present invention and its exemplary embodiments will be described with reference to the following schematic drawings.

DESCRIPTION OF THE ILLUSTRATIVE EMBODIMENTS

Figure 1:
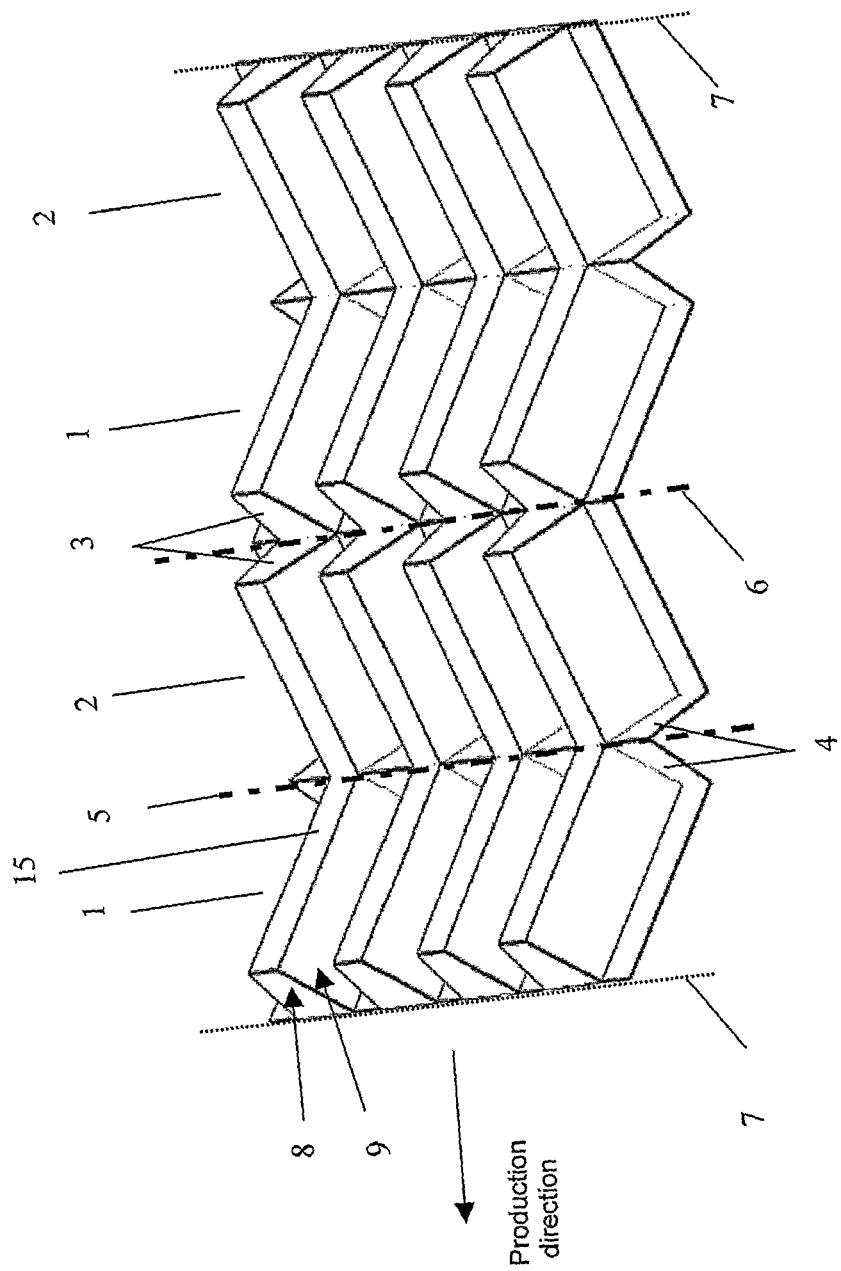
FIG. 1 shows a section of the plastic deformed material web in accordance with an embodiment of the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

FIG. 1 shows a section of a flat web made of a plastically deformable material. The plastically deformable material may be a thin thermoplastic polymeric material, a fiber composite material, plastically deformable paper or metal sheet or similar. In accordance with this embodiment the flat web has plastic deformations 1, 2 formed therein mainly perpendicular to the material web. In the regions 1 and 2, the material is deformed, e.g. polygonally, for example trapezoidally, or sinusoidally, or arcuately or the like, from the plane of the web. The deformations form ridges 8 and valleys 9 whereby each of these is not continuous. For example, the ridges are composed of a linear series of deformed sections 1, 2 e.g.

polygonal, for example trapezoidal, or sinusoidal, or arcuate sections or the like. Preferably the ridges have a top surface 15 that may be initially (e.g. as formed) parallel to the plane of the web of material. The production direction is preferably as shown in FIG. 1 however a direction perpendicular thereto (parallel to the axes 5 and 6) could be used as well.

The regions 1 and 2 are preferably formed inclined i.e. rotated towards each other around the axis 5 and/or 6, to form additionally u- or v-shaped connection areas 3 and 4. The areas 3 and 4 separate the ridge sections 1, 2, e.g. the polygonal, for example trapezoidal, or sinusoidal, or arcuate sections or the like in one row of regions 1, 2. One connecting section 3, 4 is placed between two regions 1, 2 and connecting sections 3 alternate along the row of regions 1, 2 with connecting sections 4. The areas 3, 4 form cross-valleys, i.e. perpendicular to the valleys 9. Adjacent cross-valleys are on opposite sides of the web material. The rotation of the regions 1, 2 to bring them into the initial position of FIG. 1 is preferably performed at the same time as the deformations are placed into the web of material. The web material is stretched at the transitions between the areas 1 and 2 to form the areas 3 and 4, which are substantially perpendicular to the outer surfaces 15 of the areas 1 and 2. The angle between surfaces 3, 4 on different ridge sections, allows a part of a tool to enter and thus to form these sections. The width direction of the material web elongates preferably in the direction of the axis 5 and 6 while the endless length direction of the material web is continuous along the production direction at the lines 7.

Figure 3:
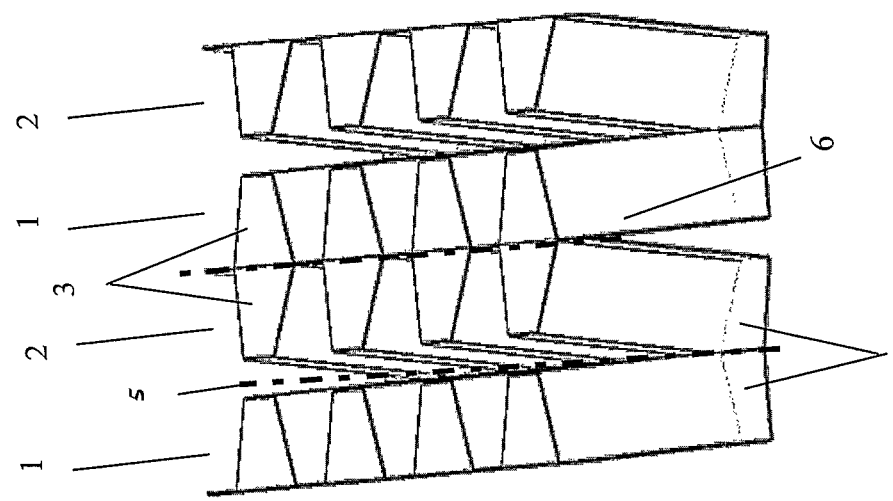
FIG. 3 shows the almost fully folded material web creating two rows of partially closed honeycomb cells in accordance with an embodiment of the present invention.

The deformation of the web material in the regions 1 and 2 serves the purpose of the formation of three-dimensional shapes, which form the walls of cell halves in the folded end product. The cells thus formed are structural and load bearing elements of the folded end product, the walls of which extend transversely to the longitudinal direction of the folded end product. In the folded end product, the cells formed by folding are preferably cylindrical in cross section, the axis of the cylinder extending transversely with respect to the longitudinal direction of the folded end product and in thickness direction of the planar honeycomb finally produced. The cross-sectional shape of a cell can be selected as desired, for example circular or polygonal, in particular even-numbered polygonal, for example hexagonal. The final cell shape is determined by the shape of the deformed areas 1, 2 in the original web and how they fold together. As shown in FIG. 3 when the web is fully folded each cell is formed from two half-cells. The cells are arranged in rows. Each final cell is formed by the bottom and sides of two longitudinally adjacent (in the web material) valley sections 9. The half cells are joined preferably together across touching surfaces 15 from two longitudinally adjacent (in the web material) ridge sections 8. Accordingly, the present invention provides a folded honeycomb, formed from a plurality of cells arranged in rows, with the following features: the cells have lateral cell walls which adjoin one another in the form of a ring and are bounded toward two opening sides of the cell by covering-layer planes whereby the cells are each bridged or closed completely in one or other of the covering-layer planes. The folded honeycomb is formed from a substantially uncut flat body. The folded honeycomb contains a plurality of 3D-structures, e.g. polygonally, sinusoidally or arcuately shaped regions (1 and 2) formed by plastic deformation and connecting areas (3 and 4) in the covering-layer planes produced by the plastic deformation. At least a part of the cell walls are preferably wholly or partly permanently connected to one another, e.g. by glue or adhesive or welding. The present invention includes the final folded product being a mixture of cells with different cross-sectional shapes and/or sizes. The final honeycomb structure is a planar product whereby the cells are arranged perpendicular to the plane of the product and across the thickness. Cells on alternating sides of the planar structure are closed by the connection areas 3, 4. All the cells can be closed by the application of one or more covering layers, e.g. by laminating the planar product of the present invention with covering sheets. The present invention includes within its scope the possibility that the 3D structures 1, 2, e.g. trapezoidal, sinusoidal or circular structures in the web which form the cell walls are not fully vertical and/or not contacting each other after the folding of the deformed material web thus forming a structure which is at least in one direction open in-plane (as shown in FIG. 3).

Figure 2:
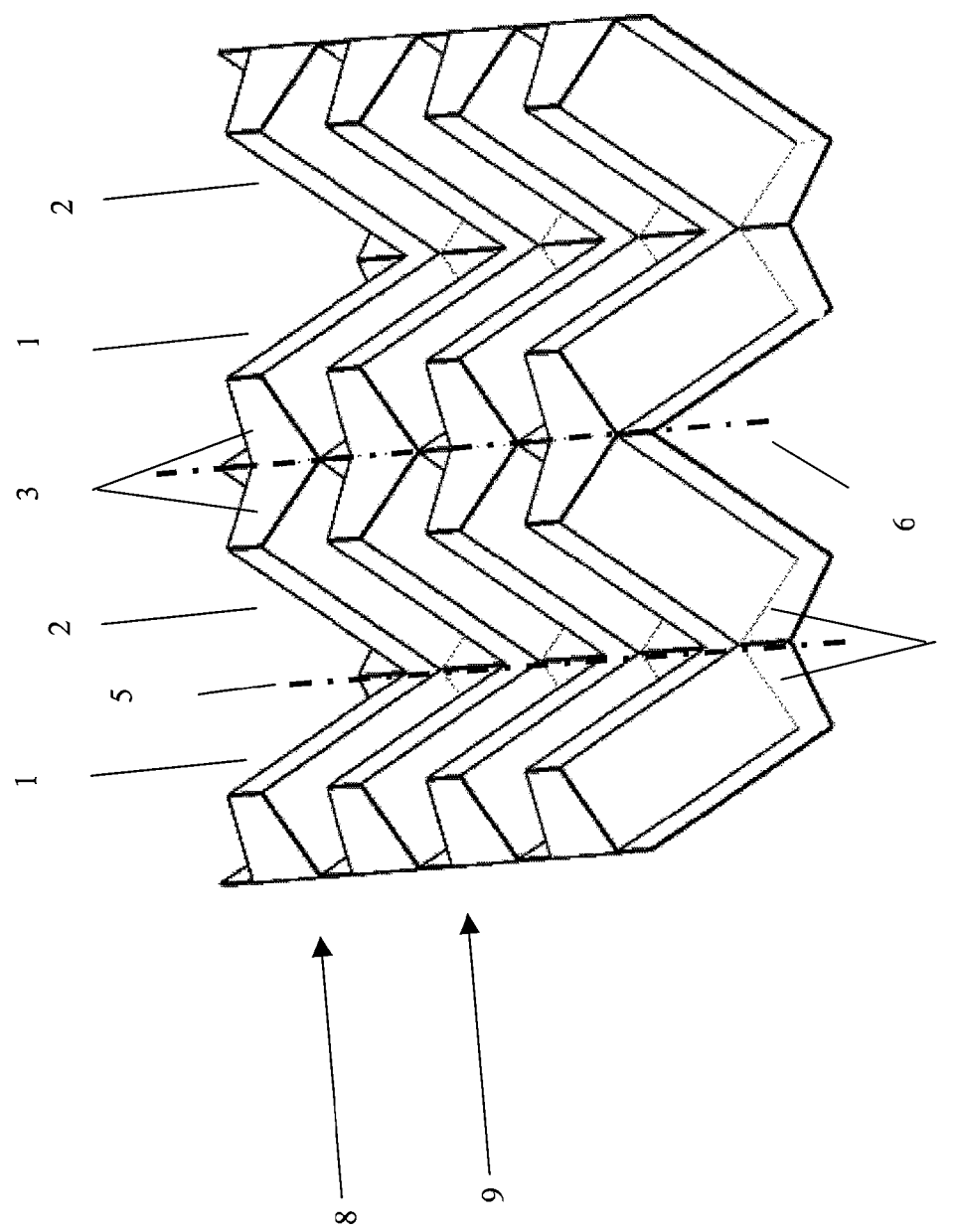
FIG. 2 shows a section of the material web half-folded to form the honeycomb cells in accordance with an embodiment of the present invention.

Returning to FIG. 1, the production method continues by rotating the regions 1 and 2 further so that the surfaces 15 from adjacent ridge sections are adjacent to each other or preferably touch. FIG. 2 shows a further intermediate state in the production of the folded honeycomb. The narrowing of the plastically deformed material web occurs by the folding operation of the material web about the folding lines 5 and 6. The u- or v-shaped connection areas 3 and 4 are unfolded and come to lie flat in the plane perpendicular to the cell walls. The areas 3 and 4 are introduced to avoid substantial deformation of the 3D structures of the material web e.g. the polygonally, for example trapezoidally, or sinusoidally, or arcuately deformed sections 1 or 2 or the like.

FIG. 3 shows the material almost fully folded to form two rows of hexagonal honeycomb cells. As a result of being folded together, the adjacent regions 3 (respectively 4) butt against one another. Each honeycomb cell is then closed by an area 3 or 4 on at least one side. That is the cells have on one end a closed surface formed by the areas 3, 4. The surfaces 15 can be connected to one another, e.g. with glue or adhesive or by welding such as ultrasonic welding. However, this connection is not an essential requirement of the present invention.

Figure 4:
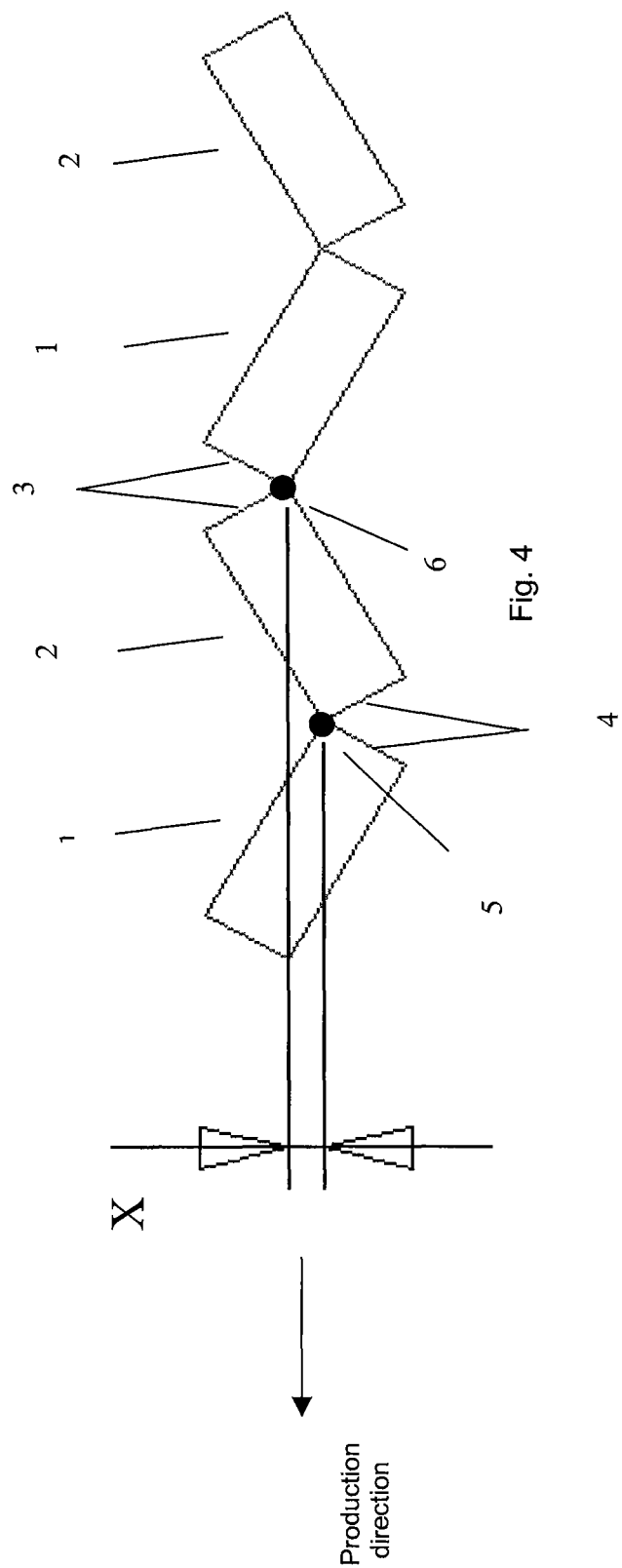
FIG. 4 shows a side view of the plastically formed material web section in accordance with an embodiment of the present invention.

The above process relies on folding the deformed web material whereby the way the 3D-structures 1, 2 and the surfaces 3, 4 are formed is done to ease the folding and rotation process. FIG. 4 shows a side view of the formed material web prior to a folding operation. To ease the folding operation the plastically deformed material web has the axis 5 and 6 (around which the material regions 1 and 2 rotate during folding) preferably positioned out-of-plane with a positive value "x". The dimension x is selected so that the cross-valley on the upper surface of the material has its lowest apex joining point on the axis 6 of the valley higher than the apex joining point on the axis 5 of a cross-valley which is on the lower surface of the web. A longitudinal force along the production direction will act through the axes 5 and 6 and by so doing will exert a bending moment about the axes 5, 6. This allows that the formed material web can be folded up by simple compression in the production direction.

The production can be automated and run continuously. Preferably pairs of rollers are used to push the material web together in production direction. However, rotating tools, oscillating translating tools or guiding profiles can be used to help or ensure the folding up of the web. Accordingly, an independent aspect of the present invention is to form a folded honeycomb by means of non-cutting, continuous, plastic rotation forming of a material web. The plastic deformation can be carried out, for example, by means of a "rotation vacuum thermoforming" process, such as is common in the production of air-bubble film. The material, provided as a preheated film or directly via a film die from an extruder, is preferably drawn by a profiled roll with the aid of vacuum. Inter-engaging profiles on the rolls running against each other can also be used.

The surface of the vacuum roller for the thermoforming of the material web has a relative complex geometry to enable that in the formed material web the areas 1 and 2 are not only formed but also preferably only slightly rotated (e.g. 10 to 30°) towards each other. This allows the formation of the v-shaped areas 3 and 4, and ensures a vacuum thermoformable airtight shape of the material web that can be folded by further rotation (e.g. of about 80° to 60°) of the areas 1 and 2 around the axis 5 and 6.

Figure 5:
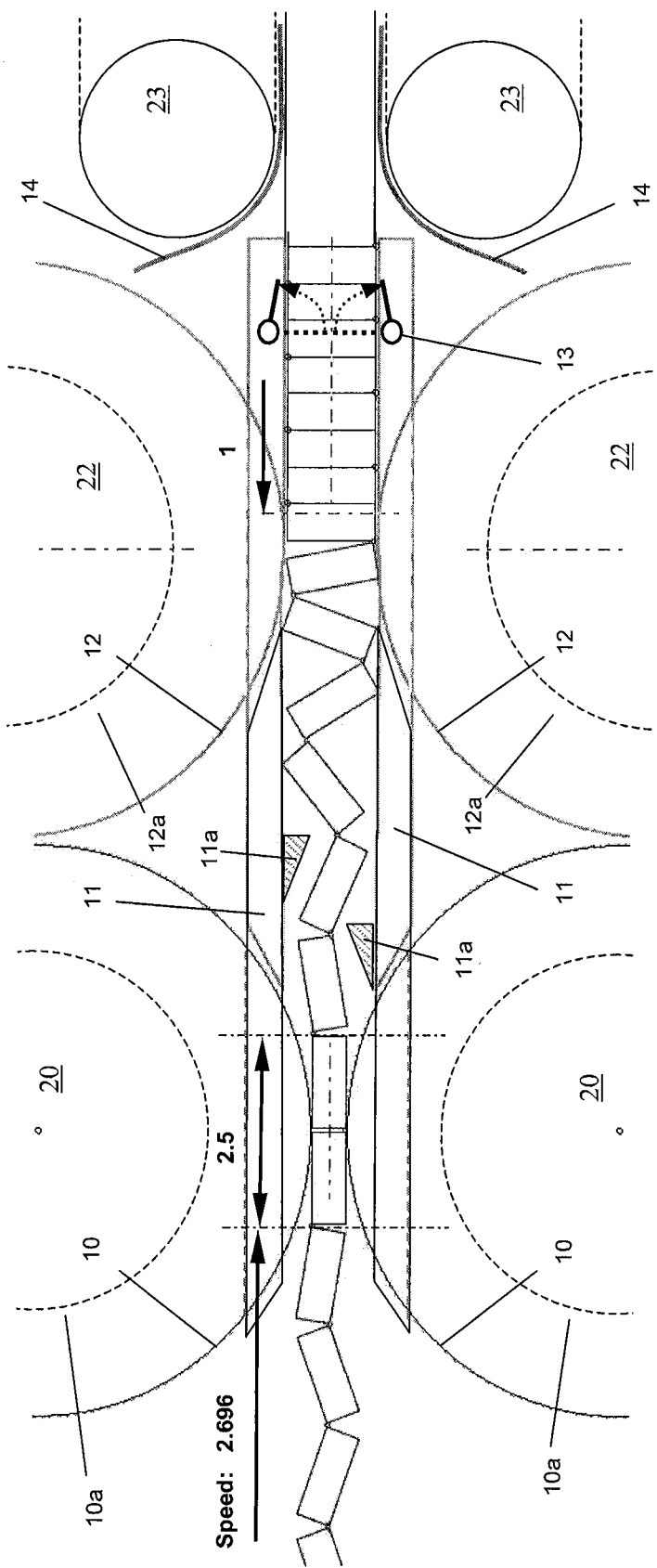
FIG. 5 shows a side view on the material web during the folding process, showing folding equipment in accordance with an embodiment of the present invention.

FIG. 5 shows a side view of the material web during the folding operation and a cross section of a folding equipment in accordance with an embodiment of the present invention. The speed of the non-folded material web relative to the folded honeycomb core i.e. the material take-up factor is shown for a half closed thermoplastic honeycomb core open with a thickness of 8 mm and a cell size of 6.4 mm. The unfolded material runs at a speed of 2.696 in arbitrary speed units; the reduces to 2.5 within the first set of rollers 20 and then further to 1 in the second rollers 22. The final speed is that of the throughput of the folded honeycomb planar structure.

The folding unit contain a pair of feeding rollers 20, e.g. rubber coated feeding rollers 10, with grooves 10*a* within the surfaces are placed upstream of a guiding grid 11 to keep the material web in-plane during folding and a second set of rollers 22, e.g. rubber coated pushing rollers 12 with similar grooves 12*a* to apply a counter pressure, which ensures a sufficient in-plane compression force to enable the folding. The compression force between the lower and upper feeding rollers 20 may reduce the inclination and rotation of the areas 1 and 2 towards each other by elastic deformation, but in the section between the feeding rollers 20 and the counter rollers 22 the material web will move back into is thermoformed shape, preferably but not necessarily without the help of tools or guides 11*a*, and continue to folded up. A gating and/or braking mechanism 13 initially retards or stops the web. It opens at a force that is generated only by the material web in the fully folded stage. It continues to apply a friction force in its open state as the folded web is formed.

The folded honeycomb is preferably directly further processed to a lightweight sandwich panel by lamination or direct extrusion of covering layers 14 onto both sides of the honeycomb core, e.g. with lamination rollers or belts 23. The equipment provided by the present invention can including a deforming and folding unit as well as a core gluing or welding unit and a lamination unit.

Figure 6:
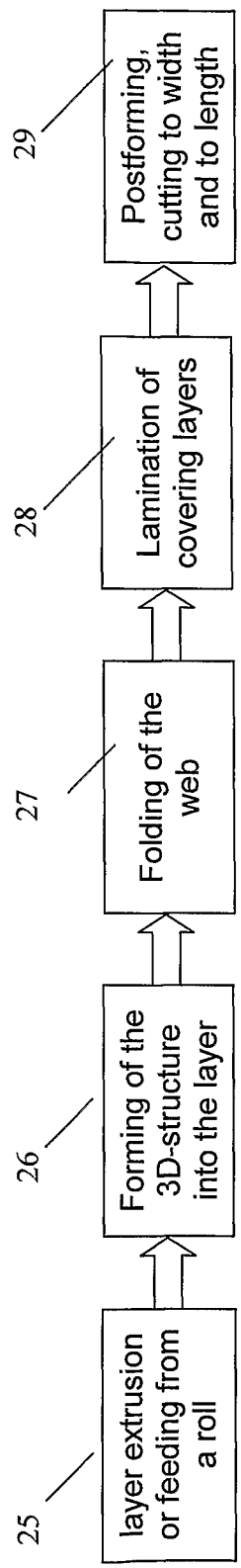
FIG. 6 shows the successive in-line steps in a continuous panel production line in accordance with an embodiment of the present invention.

FIG. 6 shows the successive in-line production steps for a continuous panel production. The in-line postforming is optional and can include the forming of edge closures or edge profiles. In step 25 the web sheet material is provided either directly from a suitable forming equipment such as an extruder or from a roll of web material. Optionally the web of material is maintained at a temperature or heated up to forming temperatures. In step 26 the 3D structures 1, 2 are formed in the web material by any suitable process e.g; vacuum forming or hot rolling. In step 27 the web material with the 3D-structures formed is folded together to form the honeycomb core. Optionally in step 28 a lamination of one or more cover layers or other layers is performed either in-line or off-line. In step 29 postforming operations are performed such as cutting to length or forming the honeycomb material into shapes, e.g. by pressing or fixing the honeycomb material to another, e.g. to a metal part.

The present invention includes folded honeycombs where the connecting areas 3 and 4 are later e.g. during lamination of non-woven covering layers are removed, e.g. by cutting or melting away so that all cells are opened on both sides, leading to a 3D-formable sandwich preform.

Dependent on the raw material used for the folded honeycomb core and the covering layers the sandwich panel can be used for example for structural components, impact and crash protection, decorative panels or packaging applications.

The invention claimed is:

1. A folded honeycomb, formed from a plurality of cells arranged in rows, comprising: cells comprising two 3D-structures forming cell halves, the cell halves adjoining each other in the longitudinal direction of each cell to form lateral cell walls which adjoin one another in the cross-sectional form of a ring and, the cells being bounded toward first and second opening sides of each cell by covering-layer planes whereby the cells are each bridged completely in one or other of the covering-layer planes; the 3D-structures are formed by plastic deformation from uncut flat body along with connecting areas produced by plastic deformation, the 3D-structures being folded together to form the lateral walls, the connecting areas closing the cells at the first and second opening sides of the cells, the connecting areas being located in one or other of the covering-layer planes in the folded honeycomb, and connecting in one of said covering-layer planes the two cell halves of a cell and in the other covering-layer plane adjacent cell halves of two neighboring cells, each cell has an opening defined by the lateral cell walls covered by a first covering-layer; each cell has a bottom area defined by the lateral cell walls and covered by a second covering-layer; each cell is surrounded by four adjacent cells having openings covered by the second covering-layer opposite the first covering-layer, all cells extending between the two covering-layers; the honeycomb, in each covering-layer plane, has alternate rows of openings and bottom areas, the folded honeycomb being a lightweight sandwich panel after lamination or direct extrusion of the covering layers on both sides of the honeycomb core.

2. The folded honeycomb of claim 1, wherein the 3D-structures are polygonally, sinusoidally or arcuately shaped regions.

3. The folded honeycomb according to claim 1 or 2, in which at least a part of the cell walls are wholly or partly permanently connected to one another.

4. The folded honeycomb according to claim 1, in which the flat body is formed from a thermoplastic polymer, a fiber composite material or a plastically deformable paper or metal sheet.

5. A process for producing a folded honeycomb from a flat body composed of a plastically deformable material, comprising:
 a) plastically deforming the flat body to form cell halves having 3D-structures and connection areas therein, the connection areas being formed between 3D-structures;
 b) folding the 3D-structures towards each other to form cells made from the cell halves, the longitudinal ends of the cells being bounded toward first and second opening sides by covering-layer planes, the cell halves adjoining each other in the longitudinal direction of each cell to form lateral cell walls, the cell walls adjoining one another in the cross-sectional form of a ring so that a cell wall of one cell adjoins the cell wall of another cell in a honeycomb structure, the connecting areas closing the cells at the first and second opening sides of the cells, the connecting areas being located in one or other of the covering-layer planes in the folded honeycomb, and connecting in one of said covering-layer planes the two halves of a cell and in the other covering-layer plane adjacent cell halves of two neighboring cells; each cell has an opening defined by the lateral cell walls covered by a first covering-layer; each cell has a bottom are defined by the lateral cell walls and covered by a second covering-layer; each cell is surrounded by four adjacent cells having openings covered by the second covering-layer opposite the first covering-layer, all cells extending between the two covering-layers; the honeycomb, in each covering-layer plane, has alternate rows of openings and bottom areas, and c) processing the folded honeycomb to a lightweight sandwich panel after lamination or direct extrusion of the covering layers on both sides of the honeycomb core.

6. The process according to claim 5, wherein the 3D-structures are polygonally, sinusoidally or arcuately shaped regions.

7. The process according to claim 5 or 6, wherein at least a part of mutually contacting surface areas and/or edges of the cells are firmly connected to one another.

8. The process according to claim 5, wherein the deformable material is a thermoplastic polymer, a fiber composite material or a plastically deformable paper or metal sheet.

9. The process according to claim 5, wherein the deforming to form the 3D-structures is carried out by means of a non-cutting rotation process.

10. The process according to claim 9, which the deformation is carried out by means of a rotation vacuum thermoforming process.

11. An equipment for producing a folded honeycomb from a flat body composed of a plastically deformable material, comprising:

a) means for plastically deforming the flat body to form cell halves made of 3D-structures and connection areas therein, the connection areas being formed between the 3D-structures;

b) means for folding the 3D-structures towards each other to form cells from the cell halves, the cell halves adjoining one another in the longitudinal direction of each cell to form lateral cell walls in the cross-sectional form of a ring so that a cell wall of one cell adjoins the cell wall of another cell in a honeycomb structure, the longitudinal ends of the cells being bounded toward first and second opening sides, the connecting areas closing the cells at the first and second opening sides of the cells, the connecting areas being located in one or other of the covering-layer planes in the folded honeycomb, and connecting in one of said covering-layer planes the two cell halves of a cell and in the other covering-layer plane adjacent cell halves of two neighboring cells; each cell has an opening defined by the lateral cell walls covered by a first covering-layer; each cell has a bottom area defined by the lateral cell walls and covered by a second covering-layer; each cell is surrounded by four adjacent cells having openings covered by the second covering-layer opposite the first covering-layer, all cells extending between the two covering-layers; the honeycomb, in each covering-layer plane, has alternate rows of openings and bottom areas and;

c) means for processing the folded honeycomb to a lightweight sandwich panel after lamination or direct extrusion of the covering layers on both sides of the honeycomb core.

12. Equipment according to claim 11, wherein the means for plastically deforming the flat body includes a first roller with a surface profile to form the 3D-structures.

13. Equipment according to claim 12, wherein the means for folding includes a second roller located downstream of the first roller and turning at a lower speed than the first roller.

14. Equipment according to claim 12 or 13, wherein the means for plastically deforming the flat body includes a second roller and a guide between the first and second roller.

15. Equipment according to claim 12, wherein the first roller is adapted as a rotation vacuum thermoforming roller.

16. Equipment according to claim 11, further comprising a core gluing or welding and lamination unit.

\* \* \* \* \*